United States Patent
Hansson et al.

(10) Patent No.: US 12,492,513 B2
(45) Date of Patent: Dec. 9, 2025

(54) WATER-RESISTANT MINERAL-COATED CELLULOSE-BASED SUBSTRATE

(71) Applicant: Stora Enso OYJ, Helsinki (FI)

(72) Inventors: Susanne Hansson, Tyresö (SE); Raija Bådenlid, Karlstad (SE)

(73) Assignee: Stora Enso OYJ, Helsinki (FI)

( * ) Notice: Subject to any disclaimer, the term of this patent is extended or adjusted under 35 U.S.C. 154(b) by 277 days.

(21) Appl. No.: 17/996,942

(22) PCT Filed: May 11, 2021

(86) PCT No.: PCT/IB2021/054010
§ 371 (c)(1),
(2) Date: Oct. 24, 2022

(87) PCT Pub. No.: WO2021/229437
PCT Pub. Date: Nov. 18, 2021

(65) Prior Publication Data
US 2023/0167609 A1 Jun. 1, 2023

(30) Foreign Application Priority Data
May 13, 2020 (SE) .................................... 2050558-2

(51) Int. Cl.
| | | |
|---|---|---|
| D21H 21/16 | (2006.01) | |
| D21H 19/38 | (2006.01) | |
| D21H 19/46 | (2006.01) | |
| D21H 19/58 | (2006.01) | |
| D21H 19/60 | (2006.01) | |
| D21H 27/30 | (2006.01) | |

(52) U.S. Cl.
CPC ........... *D21H 21/16* (2013.01); *D21H 19/385* (2013.01); *D21H 19/46* (2013.01); *D21H 19/58* (2013.01); *D21H 19/60* (2013.01); *D21H 27/30* (2013.01)

(58) Field of Classification Search
CPC ...... D21H 19/385; D21H 19/46; D21H 27/30; D21H 17/11; D21H 17/74; D21H 19/36; B32B 2250/26; B32B 29/005; B32B 2255/12; B32B 29/00; B32B 2255/20; B32B 2255/26; B32B 2307/718; B32B 2307/7265; B32B 2439/00; B32B 2439/70; B32B 2590/00; B32B 27/10; B32B 29/06; B32B 2307/73
See application file for complete search history.

(56) References Cited

U.S. PATENT DOCUMENTS

| | | | |
|---|---|---|---|
| 2008/0245273 A1 | 10/2008 | Vyorkka et al. | |
| 2013/0236647 A1 | 9/2013 | Samain et al. | |
| 2014/0113080 A1 | 4/2014 | Stinga et al. | |
| 2015/0129102 A1* | 5/2015 | Samain ................. | C08K 3/013 |
| | | | 156/60 |
| 2015/0231867 A1* | 8/2015 | Kelly ....................... | B32B 3/28 |
| | | | 428/533 |
| 2017/0087912 A1* | 3/2017 | Singh ..................... | D21H 19/54 |
| 2017/0241080 A1 | 8/2017 | Eichholz et al. | |
| 2018/0179708 A1* | 6/2018 | Karlsson .................. | C08B 3/10 |

FOREIGN PATENT DOCUMENTS

| | | |
|---|---|---|
| CN | 108625219 A | 10/2018 |
| EP | 3561178 A1 | 10/2019 |
| KR | 101908335 B1 | 12/2018 |
| KR | 101918042 B1 | 1/2019 |
| WO | 2012066015 A1 | 5/2012 |
| WO | 2017002005 A1 | 1/2017 |

OTHER PUBLICATIONS

Hu, Zeshan et al., Water resistance improvement of paper by superhydrophobic modification with microsized CaCO3 and fatty acid coating, Colliods and Surfaces A: Physiochem. Eng. Aspects 351 (2009) 65-70.
International Search Report from corresponding PCT application No. PCT/IB2021/054010, mailed on Jun. 17, 2021.
Tai-Ju Lee et al., Preventing Discoloration of Poly(vinyl alcohol)-Coated Paper Hydrophobized by Gas Grafting with Palmitoyl Chloride, ACS Sustainable Chem. Eng. 2018, 6, 1702-1707.
Extended European Search Report from corresponding European application No. 21804513.6 dated May 15, 2024.

* cited by examiner

*Primary Examiner* — Dennis R Cordray
*Assistant Examiner* — Matthew M Eslami
(74) *Attorney, Agent, or Firm* — Greer, Burns & Crain, Ltd.

(57) ABSTRACT

The present invention relates to a water-resistant mineral-coated cellulose-based substrate, comprising a cellulose-based substrate, and a mineral-coating layer disposed on at least one surface of said substrate, said mineral coating comprising 50-95 wt % of a particulate mineral and 5-50 wt % of a water-dispersible binder based on the total dry weight of the mineral coating, and wherein said mineral-coating layer has been subjected to grafting with a fatty acid halide. The invention further relates to a method for manufacturing the water-resistant mineral-coated cellulose-based substrate.

16 Claims, No Drawings

WATER-RESISTANT MINERAL-COATED CELLULOSE-BASED SUBSTRATE

This application is a U.S. National Phase under 35 U.S.C. § 371 of International Application No. PCT/IB2021/054010 filed May 11, 2021, which claims priority under 35 U.S.C. §§ 119 and 365 to Swedish Application No. 2050558-2 filed May 13, 2020.

TECHNICAL FIELD

The present disclosure relates to mineral-coated cellulose-based substrates, such as paper or paperboard, for use in wet or damp environments.

BACKGROUND

Water-resistance is an important property in many paper or paperboard applications. Some examples include packaging, such as boxes, and other containers; fresh and aseptic liquid packaging; boxes, trays, or cups for hot, cold, dry, wet and frozen food and beverages; products for outdoor use such as boxes, signs and posters; pots, trays and covers for plants; packages for construction materials, and construction materials.

Coating of paper or paperboard with plastics is often employed to combine the mechanical properties of the paperboard with the barrier and sealing properties of a plastic film. A problem with the addition of plastics is that the repulpability of the material is severely reduced, which also can affect the recycling streams. Therefore, as few different material types as possible is desirable in packaging materials.

Paper or paperboard for use in wet or damp environments is also usually treated with sizing agents to enhance certain qualities; and above all, to increase the resistance to penetration of water and other liquids into the cellulose-based substrate, which is important to maintain the integrity and/or function of the substrate. There are two main types of sizing: internal sizing and surface sizing. For internal sizing, chemicals are added to the pulp at the wet end, for example alkyl ketene dimer (AKD), alkenyl succinic anhydride (ASA) or rosin sizing agent. Common surface-sizing agents include, e.g., modified starches and carboxymethyl cellulose.

Plastic-coated paperboard is also often treated with a hydrophobic sizing agent to prevent so-called edge wick, i.e. absorption of liquid at the cut edges (or so-called raw edges) of the paperboard. Edge-wick resistance is an important parameter in many applications.

A problem with internal sizing agents, such as AKD, can be that they interfere with the hydrogen bonding between the cellulose fibers, giving a debonding effect and hence a weaker material. To compensate for the weaker material, the grammage of paper and board is increased leading to higher carbon footprint due to overuse of wood fibers and higher transport weight at all stages downstream the production.

Another problem associated with internal sizing agents is migration of the sizing chemicals which can result in deposits on the production machinery and/or finished products.

To improve the wet strength of the material, the internal sizing agent can be combined with a wet-strength agent. A wet-strength agent improves the tensile properties of the paper or paperboard in the wet state by for example covalently binding to the cellulose fibers and also by forming a crosslinked network between the fibers that does not break upon wetting. Common wet-strength agents include urea-formaldehyde (UF), melamine-formaldehyde (MF) and polyamide-epichlorohydrin (PAE). Other wet strength agents can give wet-strength by other mechanisms, and some of these wet-strength agents can also have a temporary wet-strength function.

A problem with the addition of wet strength agents is that the repulpability of the material is severely reduced.

More recently, grafting with fatty acid halides has emerged as an alternative or complement to hydrophobic sizing. This technique utilizes fatty acid halides, preferably fatty acid chlorides, which are grafted covalently to hydroxyl groups on cellulose-based substrates, like paper and paperboard. In other words, grafting results in fatty acids being bound to functional OH-groups on the substrate by means of chemisorption, e.g. covalently bound thereto. The grafting is performed on the pre-formed and dried material. The fatty acid halide reagent can be applied in liquid, gas and/or spray form to the surface of the substrate. The reagent can thereafter diffuse to a certain depth, typically around 100-150 μm, depending on the density of the substrate.

Many paper and paperboard products are provided with a coating to give desirable properties such as whiteness, brightness, gloss, and/or high-quality print. Typical coating components include pigments, binders, additives, and water. Commonly used pigments include calcium carbonate, talc, titanium dioxide, and/or kaolin clay. As binder, a styrene-butadiene latex, styrene-acrylate latex, vinylacetate latex, vinylacetate-acrylate latex, or bio-binders such as carboxymethyl cellulose, and/or starch can be utilized. Examples of other additives include insolubilizers, lubricants, defoamers, thickening agents, co-binders, stabilizers, and optical brightening agents (OBAs).

There remains a need for improved solutions to render cellulose-based substrates, such as mineral-coated paper or paperboard, water-resistant, without sizing agent migration issues, without weakening the material, and without losing the repulpability of the material. There also remains a need for improved solutions to reduce the need for plastics in coated paper and paperboard, which is beneficial both from a sustainability and recyclability perspective.

DESCRIPTION OF THE INVENTION

It is an object of the present disclosure to provide a water-resistant mineral-coated cellulose-based substrate with good repulpability.

It is a further object of the present disclosure to provide a water-resistant mineral-coated cellulose-based substrate with similar repulpability as compared to a corresponding non-water-resistant mineral-coated cellulose-based substrate.

It is a further object of the present disclosure to provide a method for rendering a mineral-coated cellulose-based substrate water-resistant, without losing the repulpability of the material.

It is a further object of the present disclosure to provide a method for rendering a mineral-coated cellulose-based substrate water-resistant, which reduces the problem with sizing agent deposits on production machinery and/or finished products.

It is a further object of the present disclosure to provide a water-resistant mineral-coated cellulose-based substrate which is free from added wet strength agents, particularly crosslink-forming wet strength agents, for example urea-formaldehyde (UF), melamine-formaldehyde (MF) and/or polyimide-epichlorohydrin (PAE).

The above-mentioned objects, as well as other objects as will be realized by the skilled person in the light of the present disclosure, are achieved by the various aspects of the present disclosure.

According to a first aspect illustrated herein, there is provided a water-resistant mineral-coated cellulose-based substrate, comprising
  a cellulose-based substrate, and
  a mineral coating layer disposed on at least one surface of said substrate,
  said mineral coating comprising:
    50-95 wt % of a particulate mineral, and
    5-50 wt % of a water-dispersible binder
  based on the total dry weight of the mineral coating, and
  wherein said mineral-coating layer has been subjected to grafting with a fatty acid halide.

Many paper and paperboard products require a mineral-coated surface to give desirable properties such as whiteness, brightness, gloss, and/or high-quality print.

Typical mineral coating components include one or more particulate mineral(s) as the main component, and one or more water-dispersible binder(s) as the secondary component. Mineral coatings may also comprise optional additives, such as insolubilizers, lubricants, defoamers, thickening agents, co-binders, stabilizers, and/or optical brightening agents (OBAs). The additives are typically present at an amount of less than 10 wt %, based on the total dry weight of the mineral coating.

Grafting with fatty acid halide has been identified as an interesting alternative to internal sizing agents and wet-strength agents for rendering cellulose-based substrates hydrophobic or water resistant. However, mineral-coated substrates have not been considered compatible with fatty acid halide grafting as the main components of mineral coatings typically do not have a high incidence of hydroxyl groups. In fact, it was believed that in order to achieve an effective grafting of fatty acid halides on a mineral coating, the mineral coating must first be coated with another coating, such as a PVOH coating, having a high incidence of hydroxyl groups. As the mineral coating covers at least one of the surfaces of the paper or paperboard, it also limits the accessibility to the underlying cellulose-based substrate for fatty acid halide grafting.

The present inventors have now surprisingly found that conventional mineral coatings, formed mainly of low hydroxyl components, can be effectively grafted with fatty acid halides, without prior chemical modification or coating, to obtain a highly hydrophobic and water-resistant mineral-coated surface.

As shown in Example 1, the $Cobb_{60}$ value of a mineral-coated surface, wherein the mineral coating used contained only a very small fraction of PVOH, of a cellulose-based substrate was reduced from 80 $g/m^2$ to about 4 $g/m^2$ after being subjected to grafting with palmitoyl chloride (C16). As comparison, the uncoated backside of the cellulose-based substrate had a $Cobb_{60}$ value of about 16 $g/m^2$ after being subjected to grafting with palmitoyl chloride (C16).

The use of fatty acid halide grafting directly on the mineral coating surprisingly makes it possible to obtain a hydrophobic and water-resistant mineral-coated surface without an extra process step of first covering the pigment coating with a PVOH coating. The highly hydrophobic and water-resistant surface could be obtained with a very low amount of fatty acid halides, such as less than 1 $g/m^2$. Example 2 shows that by adding more PVOH to the pigment coating, the grafting levels increase, and Cobb levels are maintained low. Example 3 shows that the water resistance is reduced also for Cobb values measured during longer intervals when grafting a commercial mineral coated product.

The use of fatty acid halide grafting directly on the mineral coating can also reduce the need for a water-resistant polymer coating on top of the mineral coating, which would reduce the need for an additional coating step, facilitating the processability and giving savings in material, time, and cost.

The grafting may also reduce the need for internal sizing agents. An advantage of grafting with fatty acid halides over internal sizing agents and wet-strength agents is the high reactivity of the fatty acid halides towards the hydroxyl groups present on the pulp fibers. The high reactivity of the fatty acid halides results in that the reagent will be covalently bound to the substrate to a much higher extent compared to internal sizing agents, reducing the issues related to migration. The fatty acid halide grafting is preferably performed on the formed and dried cellulose-based substrate. As the grafting is performed on the formed and dried substrate, the interference with fiber-fiber hydrogen bonding is very limited.

The mineral coating comprises a particulate mineral, e.g. a pigment or a mixture of different pigments, as main component. The amount of particulate mineral in the mineral coating is at least 50 wt %, and preferably above 50 wt %, based on the total dry weight of the mineral coating. The amount of particulate mineral in the mineral coating may for example be in the range of 60-95 wt %, 70-95 wt %, or 80-95 wt %, based on the total dry weight of the mineral coating.

In some embodiments, the particulate mineral is selected from the group consisting of kaolin, talc, ground calcium carbonate, precipitated calcium carbonate, bentonite, and/or combinations thereof.

The mineral coating further comprises a water-dispersible binder, e.g. a styrene-butadiene latex, styrene-acrylate latex, vinylacetate latex, vinylacetate-acrylate latex, carboxymethyl cellulose, and/or starch. The amount of binder in the mineral coating is preferably lower than the amount of particulate mineral. The amount of binder is 50 wt % or less, and preferably less than 50 wt %, based on the total dry weight of the mineral coating. The amount of binder in the mineral coating may for example be in the range of 5-40 wt %, 5-30 wt %, or 5-20 wt %, based on the total dry weight of the mineral coating.

In some embodiments, the water-dispersible binder is a latex binder. In some embodiments, the water-dispersible binder is a synthetic polymer latex, preferably selected from the group consisting of a styrene-butadiene latex and styrene-acrylate latex, and combinations thereof. In some embodiments, the water-dispersible binder is a biologically derived binder such as starch or carboxymethyl cellulose (CMC).

In some embodiments, the mineral coating comprises functional hydroxyl (OH) groups onto which the fatty acid halide can bind during grafting. In some cases, the particulate mineral material comprises inherent OH-groups and in some cases a small amount of additive containing OH-groups is added. An example of such additive is polyvinyl alcohol. Other examples are synthetic binders and/or bio-binders. According to one embodiment of the invention, the mineral-coating layer comprises a small additive amount of polyvinyl alcohol (PVOH), i.e. less than 10 wt % based on the total dry weight of the mineral coating. Higher amounts do not seem to give any further benefits and may also undesirably affect the viscosity of the coating. In some embodiments, the mineral coating layer comprises 0.1-5 wt %, preferably 0.2-3 wt %, polyvinyl alcohol (PVOH), based on the total dry weight of the mineral coating.

The mineral-coating layer may further comprise one or more additives to facilitate the application and forming of the mineral coating or to impart various properties to the finished coating. In some embodiments, the mineral coating layer further comprises an additive selected from the group consisting of an insolubilizer, a lubricant, a defoamer, a thickening agent, a co-binder, a stabilizer, and/or an optical brightening agent (OBA), and combinations thereof. The concentration of each additive may be in the range of 0.01-10 wt % based on the total dry weight of the mineral coating.

The mineral coating layer may have a basis weight in the range of 2-50 g/m$^2$, preferably in the range of 5-30 g/m$^2$.

The mineral-coating layer has been subjected to grafting with a fatty acid halide. The fatty acid halide grafting increases the hydrophobicity and water resistance of the mineral-coated surface.

The use of fatty acid halide grafting directly on the mineral coating surprisingly makes it possible to obtain a hydrophobic and water-resistant mineral-coated surface with a single process step and a low amount of reagent. The highly hydrophobic and water-resistant surface could be obtained with a very low amount of fatty acid halides, such as less than 1 g/m$^2$.

In some embodiments, the amount of fatty acid applied on the mineral coating layer is less than 1 g/m$^2$, preferably less than 0.85 g/m$^2$.

The use of fatty acid halide grafting directly on the mineral coating can also reduce the need for a water-resistant polymer coating on top of the mineral coating, which would reduce the need for an additional coating step, facilitating the processability and savings in material, time, and cost.

In some embodiments, the fatty acid halide grafted on the coated cellulose-based substrate has an aliphatic chain length of 8-22 carbon atoms. Examples of fatty acid halides include octanoyl chloride (C8), lauroyl chloride (C12), myristoyl chloride (C14), palmitoyl chloride (C16), and stearoyl chloride (C18), and/or a mixture thereof. In some preferred embodiments, the fatty acid halide grafted on the coated cellulose-based substrate is palmitoyl chloride or stearoyl chloride.

The grafting typically involves contacting the substrate with a fatty acid halide in a liquid, spray and/or vapor state. The reaction between the fatty acid halide, e.g. fatty acid chloride, and functional hydroxyl groups of the substrate results in covalent bonds between the reagent and the substrate. Ungrafted and thereby unbound fatty acids may also be present on or in the substrate to a certain extent.

One example of a grafting process which could be used in production of the coated cellulose-based substrate of the present disclosure is described in detail in the international patent application WO2012066015A1. Another example of a grafting process, which could be used in production of the mineral-coated cellulose-based substrate in the present disclosure, is described in detail in the international patent application WO2017002005A1. The grafting process may also be repeated, in order to increase the amount of grafted and free fatty acids in the substrate.

The mineral-coated cellulose-based substrate is preferably dry when the fatty acid halide grafting is performed. The term "dry" as used herein means that the substrate has a dry content above 80%, preferably above 90%, and more preferably above 95% by weight.

The fatty acid halide grafting of the mineral-coating layer results in a surface having a Cobb$_{60}$ value below 20 g/m$^2$. In some embodiments, the surface of the mineral-coating layer subjected to grafting with a fatty acid halide has a Cobb$_{60}$ value (as determined according to standard ISO 535:2014 after 60 seconds) below 20 g/m$^2$, preferably below 15 g/m$^2$, more preferably below 10 g/m$^2$.

The cellulose-based substrate is preferably a web or sheet having a first main surface and a second main surface. The cellulose-based substrate can be mineral coated on one or both of its two main surfaces, depending on the intended use of the substrate and the need for improved properties such as whiteness, brightness, gloss, and/or high-quality print on one side or on both sides of the substrate. Depending on the need for print and water-resistance, one or both of the mineral coated surfaces may be subjected to grafting with a fatty acid halide.

In some embodiments the mineral coating is disposed on the first main surface of the substrate.

In many cases, the cellulose-based substrates will have a mineral coating layer on one of its two main surfaces, whereas the other of the two main surfaces is uncoated. Such one-side mineral-coated substrates can advantageously be subjected to grafting with a fatty acid halide on the coated surface as well as on the uncoated surface. Thus, in some embodiments, wherein no mineral-coating layer is disposed on the second main surface of the substrate, the uncoated surface has also been subjected to grafting with a fatty acid halide. Fatty acid halide applied to an uncoated surface will typically permeate into the substrate to a greater extent than fatty acid halide applied to a mineral-coated surface.

Fatty acid halide grafting on the uncoated surface can reduce or completely eliminate the need for an added internal hydrophobic sizing agent in the cellulose-based substrate. The grafting of fatty acid halides combined with the reduction or elimination of internal sizing agent compared to a similar substrate relying solely on an internal sizing agent for hydrophobicity may also reduce or completely eliminate the need for addition of a wet-strength agent. This allows for the cellulose-based substrate to be rendered water-resistant without losing the repulpability of the material.

Thus, in some embodiments the cellulose-based substrate does not comprise an added internal sizing agent. In some embodiments, the cellulose based substrate does not comprise an added internal sizing agent or an added wet-strength agent.

Coated substrates, such as substrates coated with a mineral coating, make it difficult to use grafting with a fatty acid halide as a method for rendering cellulose-based substrates hydrophobic since the coating reduces or entirely prevents diffusion of the fatty acid halide into the underlying cellulose-based layer.

In some embodiments, full hydrophobicity throughout the entire substrate may be achieved by a hydrophobic internal sizing agent in the cellulose-based substrate. This can be advantageous for thicker cellulose-based substrates and for substrates mineral coated on both of its two main surfaces, where grafting cannot be achieved through the entire thickness of the substrate, and also for some substrates coated on one side only.

Internal sizing agents are often used in paper or paperboard for use in wet or damp environments. Internal sizing agents are added to the pulp at the wet end, i.e. in the wet pulp mixture. The most common internal sizing agents are alkyl ketene dimer (AKD), alkenyl succinic anhydride (ASA) and rosin sizing agents. However, other agents that increase the resistance to penetration of water and other liquids into the cellulose-based substrate may also be used as internal sizing agents. Examples include fatty acids, fatty acid derivatives, and/or combinations thereof. Thus, in some embodiments of the cellulose-based substrate, the internal sizing agent is a hydrophobic internal sizing agent, preferably a hydrophobic internal sizing agent selected from the group consisting of alkyl ketene dimer (AKD), alkenyl succinic anhydride (ASA), a rosin sizing agent, a fatty acid, a fatty acid derivative, and combinations thereof. In some embodiments, the internal sizing agent is selected from the group consisting of alkyl ketene dimer (AKD), alkenyl succinic anhydride (ASA), a rosin sizing agent, and combinations thereof.

The amount of internal sizing agent in the cellulose-based substrate is preferably sufficient to render the substrate hydrophobic. In some embodiments, the first cellulose-based substrate comprises an amount of internal sizing agent in the range of 0.1-5 kg internal sizing agent per ton of dry substrate.

In some embodiments, the water-resistant mineral-coated cellulose-based substrate further comprises a mineral-coating layer disposed on the second main surface of the substrate,
said mineral coating comprising
50-95 wt % of a particulate mineral, and
5-50 wt % of a water-dispersible binder
based on the total dry weight of the mineral coating, and
wherein said mineral coating layer has been subjected to grafting with a fatty acid halide.

Mineral coating on both of the main surfaces provides a coated cellulose-based substrate where both sides of the substrate have the combination of improved water-resistance and properties such as whiteness, brightness, gloss, and/or high-quality print.

The mineral-coating layer disposed on the first and second main surface of the substrate may be identical or different. Each of the mineral-coating layers may independently be defined as described above with reference to the mineral-coating layer disposed on the first main surface.

In some embodiments, the mineral-coating layer disposed on the second main surface of the substrate is further defined as the mineral-coating layer disposed on the first main surface.

The cellulose-based substrate (also referred to herein as "the substrate") is preferably a sheet or web of material mainly formed from pulp of wood or other fibrous substances comprising cellulose fibers. The cellulose-based substrate is preferably paper or paperboard.

Paper generally refers to a material manufactured in sheets or rolls from the pulp of wood or other fibrous substances comprising cellulose fibers, used for e.g. writing, drawing, or printing on, or as packaging material. Paper can either be bleached or unbleached and produced in a variety of thicknesses, depending on the end-use requirements.

Paperboard generally refers to strong, thick paper or cardboard comprising cellulose fibers used for example as flat substrates, trays, boxes and/or other types of packaging. Paperboard can either be bleached or unbleached and produced in a variety of thicknesses, depending on the end-use requirements.

In some embodiments, the cellulose-based substrate is comprised of two or more cellulose-based plies. Each of the cellulose-based plies can have a certain composition of pulp fibers, such as bleached and/or unbleached Kraft pulp, sulfite pulp, dissolving pulp, thermomechanical pulp (TMP), chemi-thermomechanical pulp (CTMP), high-temperature CTMP (HT-CTMP) and/or mixtures thereof. The different plies can have different grammages and/or thicknesses and may contain different amounts of internal sizing agent and/or grafted fatty acids.

As an example, the substrate can be built up of one top-ply consisting of bleached Kraft pulp, a mid-ply consisting of a mixture of bleached Kraft pulp and CTMP, and a bottom-ply consisting of bleached Kraft pulp, wherein the mid-ply has a higher thickness than both the top and bottom plies, respectively.

In some embodiments, the basis weight of the cellulose-based substrate is in the range of 20-800 $g/m^2$.

In some embodiments, cellulose-based substrate should be capable of being grafted with fatty acid halides through the entire thickness of the substrate. In practice, this means that the grammage of the substrate should be low enough to allow the fatty acid halides to penetrate through the entire thickness of the substrate. Thus, in some embodiments the cellulose-based substrate has a basis weight below 150 $g/m^2$, preferably below 100 $g/m^2$ or below 50 $g/m^2$. The cellulose-based substrate preferably has a basis weight above 20 $g/m^2$. In some cases, penetration of the fatty acid halides can be increased by repeating the grafting process.

Fatty acid halide grafting through the entire thickness of the cellulose-based substrate removes the need for a hydrophobic sizing agent in the grafted substrate. Thus, in preferred embodiments the grafted cellulose-based substrate is free from added hydrophobic sizing agents, for example alkyl ketene dimer (AKD), alkenyl succinic anhydride (ASA) and/or rosin-sizing agent.

The reduction of internal sizing agent compared to a similar substrate relying on an internal sizing agent for hydrophobicity can reduce or completely eliminate the need for addition of a wet strength agent, for example polyamide-epichlorohydrin (PAE). This allows for the cellulose-based substrate to be rendered water-resistant, without losing the repulpability of the material.

For thicker cellulose-based substrates and for substrates mineral coated on both of its two main surfaces, where grafting cannot be achieved through the entire thickness of the substrate, full hydrophobicity throughout the entire substrate may instead be achieved by a hydrophobic internal sizing agent in the cellulose-based substrate.

The inventive mineral-coated cellulose-based substrate is water-resistant. The term "water-resistant" generally means that the mineral-coated cellulose-based substrate with grafted fatty acid halide has a higher resistance to water absorption (e.g. indicated by the $Cobb_{60}$ value as determined according to standard ISO 535:2014 after 60 seconds) than the same mineral-coated cellulose-based substrate without grafted fatty acid halide.

The water-resistant mineral-coated cellulose-based substrate is preferably suitable for use in wet or damp environments. In some embodiments, the water-resistant mineral-coated cellulose-based substrate is for use in packaging, such as boxes, and other containers; fresh and aseptic liquid packaging; boxes, trays, or cups for hot, cold, dry, wet and frozen food and beverages; products for outdoor use such as boxes, signs and posters; pots, trays and covers for plants; packages for construction materials, and construction materials.

The cellulose-based substrate has preferably been rendered hydrophobic, either by fatty acid halide grafting of the cellulose-based substrate through the entire thickness of the substrate or by an internal sizing agent comprised in the cellulose-based substrate, or by a combination thereof.

In some embodiments, the water-resistant mineral-coated cellulose-based substrate has an edge wick index (Lactic acid 1% solution, 1 h at 23° C. and 50% relative humidity) below 1.5 kg/m²h, preferably below 1 kg/m²h, and even more preferably below 0.5 kg/m²h.

In some embodiments, the water-resistant mineral-coated cellulose-based substrate has a repulpability characterized by a reject rate (as determined according to the PTS RH 021/97 test method) below 20%, preferably below 10%, and more preferably below 5%.

One advantage of the present invention is that the acid halide grafted mineral coating can reduce the need for a plastic layer as an outermost layer coated or laminated on top the mineral coating to achieve hydrophobicity. However, in some applications it may still be desired to provide the water-resistant mineral-coated cellulose-based substrate with a protective polymer layer. The mineral-coated cellulose-based substrate may further comprise at least one protective polymer layer disposed on a surface thereof. The protective polymer layer preferably comprises a thermoplastic polymer. The polymer layer may for example comprise any of the polymers commonly used in paper-based or paperboard-based packaging materials in general. Examples include polyethylene (PE), polyethylene terephthalate (PET), polypropylene (PP), polylactic acid (PLA) and polyvinyl alcohol (PVOH). Polyolefins, especially low-density polyethylene (LDPE) and high-density polyethylene (HDPE), are the most common and versatile polymers used. Thermoplastic polymers, and particularly polyolefins are useful since they can be conveniently processed by extrusion coating techniques to form very thin and homogenous films with good barrier properties. In preferred embodiments, the polymer layer comprises a polyethylene, more preferably LDPE or HDPE.

The protective polymer layer is preferably made of a polymer obtained from renewable resources.

The basis weight of the protective polymer layer is preferably less than 50 g/m². In order to achieve a continuous and substantially defect free film, a basis weight of the polymer layer of at least 2 g/m², preferably at least 4 g/m², is typically required, depending on the polymer used. In some embodiments, the basis weight of the polymer layer is in the range of 4-15 g/m² or in the range of 15-30 g/m².

According to a second aspect illustrated herein, there is provided a method for manufacturing a water-resistant mineral-coated cellulose-based substrate, said method comprising:
a) providing a cellulose-based substrate;
b) applying an aqueous mineral coating dispersion to the cellulose-based substrate and drying the coating dispersion to form a mineral-coating layer, wherein the aqueous mineral-coating dispersion is an aqueous dispersion comprising 50-95 wt % of a particulate mineral and 5-50 wt % of a water-dispersible binder based on the total dry weight of the mineral coating dispersion; and
c) subjecting the dry mineral coating layer to grafting with a fatty acid halide to obtain a water-resistant mineral-coated cellulose-based substrate.

The cellulose-based substrate provided in step a) may be further defined as set out above with reference to the first aspect.

The aqueous mineral-coating dispersion applied to the cellulose-based substrate in step b) is an aqueous dispersion comprising 50-95 wt % of a particulate mineral and 5-50 wt % of a water-dispersible binder based on the total dry weight of the mineral coating dispersion.

The coating dispersion preferably comprises a particulate mineral, e.g. a pigment or a mixture of different pigments, as its main component. The amount of particulate mineral in the coating dispersion is at least 50 wt %, and preferably above 50 wt %, based on the total dry weight of the coating dispersion. The amount of particulate mineral in the coating dispersion may for example be in the range of 60-95 wt %, 70-95 wt %, or 80-95 wt %, based on the total dry weight of the coating dispersion.

In some embodiments, the particulate mineral is selected from the group consisting of kaolin, talc, ground calcium carbonate, precipitated calcium carbonate, bentonite, and combinations thereof.

The coating dispersion further comprises a water-dispersible binder, e.g. a styrene-butadiene latex, styrene-acrylate latex, vinylacetate latex, vinylacetate-acrylate latex, carboxymethyl cellulose, and/or starch. The amount of binder in the coating dispersion is lower than the amount of particulate mineral. The amount of binder is 50 wt % or less, and preferably less than 50 wt %, based on the total dry weight of the coating dispersion. The amount of binder in the coating dispersion may for example be in the range of 5-40 wt %, 5-30 wt %, or 5-20 wt %, based on the total dry weight of the coating dispersion.

In some embodiments, the water-dispersible binder is a latex binder.

In some embodiments, the water-dispersible binder is a synthetic polymer latex, preferably selected from the group consisting of a styrene-butadiene latex and a vinyl acrylic latex, or a bio-binder and combinations thereof.

The coating dispersion preferably only comprises an additive amount of polyvinyl alcohol (PVOH), i.e. less than 10 wt % based on the total dry weight of the coating dispersion. Higher amounts do not seem to give any further benefits and may also undesirably affect the viscosity of the coating. In some embodiments, the coating dispersion comprises 0.1-5 wt %, preferably 0.2-3 wt %, polyvinyl alcohol (PVOH), based on the total dry weight of the coating dispersion.

The coating dispersion may further comprise one or more additives to facilitate the application and forming of the coating dispersion or to impart various properties to the finished coating. In some embodiments, the coating dispersion further comprises 0.01-10 wt % of an additive selected from the group consisting of an insolubilizer, a lubricant, a defoamer, a thickening agent, a co-binder, a stabilizer, and/or an optical brightening agent (OBA), and combinations thereof, based on the total dry weight of the coating dispersion.

The mineral coating dispersion is preferably applied at a dry basis weight in the range of 5-50 g/m², preferably in the range of 8-30 g/m².

The mineral coating dispersion applied to the cellulose-based substrate is preferably dried to a dry content above 80%, preferably above 90%, and more preferably above 95% by weight.

The composition of the dry mineral-coating layer may be further defined as set out above with reference to the first aspect.

The dry mineral-coating layer is then subjected to grafting with a fatty acid halide. In some embodiments, the grafting involves contacting the mineral-coating layer with a fatty acid halide in a liquid, spray and/or vapor state. During or after application of the fatty acid halide, the substrate is preferably heated to a temperature above 100° C. to promote the reaction where the reagent reacts and bind covalently to the substrate. The heating also promotes the diffusion of the reagent in the substrate. The cellulose-based substrate is preferably dry when the fatty acid halide grafting is performed.

The fatty acid halide and the grafting may be further defined as set out above with reference to the first aspect.

In some embodiments, the amount of fatty acid applied to the mineral-coating layer is less than 1 $g/m^2$, preferably less than 0.85 $g/m^2$.

The fatty acid halide grafting of the mineral-coating layer results in a surface having a $Cobb_{60}$ value below 20 $g/m^2$. In some embodiments, the surface of the mineral-coating layer subjected to grafting with a fatty acid halide has a $Cobb_{60}$ value (as determined according to standard ISO 535:2014 after 60 seconds) below 20 $g/m^2$, preferably below 15 $g/m^2$, more preferably below 10 $g/m^2$.

According to a third aspect illustrated herein, there is provided a carton blank comprising a water-resistant mineral-coated cellulose-based substrate according to the first aspect or as manufactured according to the method of the second aspect.

According to a fourth aspect illustrated herein, there is provided a container, comprising a water-resistant mineral-coated cellulose-based substrate according to the first aspect or as manufactured according to the method of the second aspect.

Generally, while the products, compositions, materials, layers and processes are described in terms of "comprising" various components or steps, the products, compositions, materials, layers and processes can also "consist essentially of" or "consist of" the various components and steps.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLES

Example 1

A bleached board of 240 $g/m^2$ was coated on one side with 10 $g/m^2$ mineral layer consisting of calcium carbonate (87.7 wt %), styrene-butadiene latex (11.8 wt %), additives (0.5 wt %; including 0.3 wt % of PVOH).

The mineral-coated board was treated with palmitoyl chloride (C16) followed by heating around 180° C. (Treated sample).

The $Cobb_{60}$ values were analyzed and the results are presented in Table 1. Remarkably, the $Cobb_{60}$ value of the treated mineral-coated surface was significantly decreased to 4 $g/m^2$ from 80 $g/m^2$ for the untreated reference.

TABLE 1

Analyses of untreated and treated mineral-coated board.

| Sample | $Cobb_{60}$ - Mineral-coated surface ($g/m^2$) |
|---|---|
| Untreated reference | 80 |
| Treated sample | 4 |

Example 2

An unsized bleached board of 240 $g/m^2$ was coated on one side with 10 $g/m^2$ mineral layer consisting of pigments (85.9 wt %), latex (13.7 wt %) and additives (0.3 wt %) without any PVOH (Untreated 0-PVOH reference).

Increasing amounts of PVOH (0.5 wt % and 2.0 wt %) were then added to the mineral coating.

The mineral-coated board samples were treated with palmitoyl chloride (C16) followed by heating around 180° C. (Treated samples).

The grafting degree (amount of covalently bound palmitic acid/total amount of palmitic acid) increased as more hydroxyl groups (from PVOH) were introduced in the mineral coating, as presented in Table 2. The Cobb60 values decreased from 130 $g/m^2$ for the untreated references to below 5 $g/m^2$ for the treated samples.

TABLE 2

Analyses of treated mineral-coated board with increasing PVOH content

| Sample | Grafting degree % |
|---|---|
| Treated 0% PVOH sample | 13 |
| Treated 0.5% PVOH sample | 16 |
| Treated 2.0% PVOH sample | 24 |

Example 3

Mineral coated commercial bleached board samples (280 $g/m^2$) were treated with palmitoyl chloride (C16) followed by heating around 180° C.

Cobb values for the reference and grafted samples were analyzed showing a significant decrease at all time intervals for the grafted samples, as presented in Table 3.

TABLE 3

Analyses of untreated and treated mineral-coated board

| Sample | $Cobb60$ ($g/m^2$) | $Cobb_{300}$ ($g/m^2$) | $Cobb600$ ($g/m^2$) |
|---|---|---|---|
| Untreated reference | 26 | 54 | 77 |
| Treated sample | 3 | 14 | 23 |

The invention claimed is:

1. A water-resistant mineral-coated cellulose-based substrate, comprising
   a cellulose-based substrate, and
   a mineral-coating layer disposed on at least one surface of said substrate,
   said mineral-coating layer comprising:
     50-95 wt % of a particulate mineral, and
     5-50 wt % of a water-dispersible binder
   based on a total dry weight of the mineral-coating layer, and
   wherein said mineral-coating layer has been subjected to grafting with a fatty acid halide,
   wherein the cellulose-based substrate is a web or sheet having a first main surface and a second main surface,
   wherein the mineral-coating layer is disposed on the first main surface of the substrate,
   wherein no mineral-coating layer is disposed on the second main surface of the substrate, and
   wherein the second main surface has also been subjected to grafting with a fatty acid halide.

2. The water-resistant mineral-coated cellulose-based substrate according to claim 1, wherein the mineral-coating layer comprises functional hydroxyl groups.

3. The water-resistant mineral-coated cellulose-based substrate according to claim 1, wherein the mineral-coating layer further comprises 0.1-5 wt % polyvinyl alcohol (PVOH), based on the total dry weight of the mineral coating.

4. The water-resistant mineral-coated cellulose-based substrate according to claim 1, wherein the particulate mineral is selected from a group consisting of: kaolin, talc, ground calcium carbonate, precipitated calcium carbonate, bentonite, and combinations thereof.

5. The water-resistant mineral-coated cellulose-based substrate according to claim 1, wherein the water-dispersible binder is a latex binder.

6. The water-resistant mineral-coated cellulose-based substrate according to claim 1, wherein the water-dispersible binder is a synthetic polymer latex.

7. The water-resistant mineral-coated cellulose-based substrate according to claim 1, wherein the mineral-coating layer further comprises 0.01-10 wt %, based on the total dry weight of the mineral coating, of an additive selected from a group consisting of: an insolubilizer, a lubricant, a defoamer, a thickening agent, a co-binder, a stabilizer, an optical brightening agent (OBA), and combinations thereof.

8. The water-resistant mineral-coated cellulose-based substrate according to claim 1, wherein the mineral-coating layer has a basis weight in a range of 2-50 $g/m^2$.

9. The water-resistant mineral-coated cellulose-based substrate according to claim 1, wherein an amount of the fatty acid applied to the mineral-coating layer is less than 1 $g/m^2$.

10. The water-resistant mineral-coated cellulose-based substrate according to claim 1, wherein the surface of the mineral-coating layer subjected to grafting with a fatty acid halide has a $Cobb_{60}$ value (as determined according to standard ISO 535:2014 after 60 seconds) below 20 $g/m^2$.

11. The water-resistant mineral-coated cellulose-based substrate according to claim 1, wherein the cellulose-based substrate is paper or paperboard.

12. The water-resistant mineral-coated cellulose-based substrate according to claim 1, wherein the cellulose-based substrate is comprised of two or more cellulose-based plies.

13. The water-resistant mineral-coated cellulose-based substrate according to claim 1, wherein said substrate is for use in wet or damp environments.

14. A method for manufacturing a water-resistant mineral-coated cellulose-based substrate, said method comprising:
   a) providing a cellulose-based substrate;
   b) applying an aqueous mineral-coating dispersion to the cellulose-based substrate and drying the coating dispersion to form a mineral-coating layer, wherein the aqueous mineral-coating dispersion is an aqueous dispersion comprising 50-95 wt % of a particulate mineral and 5-50 wt % of a water-dispersible binder based on a total dry weight of the mineral coating dispersion; and
   c) subjecting the dry mineral-coating layer to grafting with a fatty acid halide to obtain a water-resistant mineral-coated cellulose-based substrate,
   wherein the cellulose-based substrate is a web or sheet having a first main surface and a second main surface,
   wherein the mineral-coating layer is disposed on the first main surface of the substrate,
   wherein no mineral-coating layer is disposed on the second main surface of the substrate, and
   wherein the second main surface has also been subjected to grafting with a fatty acid halide.

15. The method according to claim 14, wherein the mineral-coating dispersion comprises functional hydroxyl groups.

16. The method according to claim 14, wherein the grafting involves contacting the mineral coating layer to grafting with a fatty acid halide in a liquid, a spray, a vapor state, or any combination thereof.

* * * * *